T. H. STAGG & J. ANTHONY.
WHEELED SCRAPER.
APPLICATION FILED MAY 22, 1908.

910,025.

Patented Jan. 19, 1909.

3 SHEETS—SHEET 1.

Thomas H. Stagg,
John Anthony, Inventors

T. H. STAGG & J. ANTHONY.
WHEELED SCRAPER.
APPLICATION FILED MAY 22, 1908.

910,025.

Patented Jan. 19, 1909.

3 SHEETS—SHEET 2.

WITNESSES:

Thomas H. Stagg, INVENTORS
John Anthony,
BY
ATTORNEY.

T. H. STAGG & J. ANTHONY.
WHEELED SCRAPER.
APPLICATION FILED MAY 22, 1908.

910,025.

Patented Jan. 19, 1909.
3 SHEETS—SHEET 3.

WITNESSES:

Thomas H. Stagg, INVENTORS
John Anthony,

BY

ATTORNEY

UNITED STATES PATENT OFFICE.

THOMAS H. STAGG AND JOHN ANTHONY, OF COLUMBUS, OHIO, ASSIGNORS TO THE KILBOURNE AND JACOBS MANUFACTURING COMPANY, OF COLUMBUS, OHIO, A CORPORATION OF OHIO.

WHEELED SCRAPER.

No. 910,025.        Specification of Letters Patent.        Patented Jan. 19, 1909.

Application filed May 22, 1908. Serial No. 434,410.

*To all whom it may concern:*

Be it known that we, THOMAS H. STAGG and JOHN ANTHONY, citizens of the United States, residing at Columbus, in the county of Franklin and State of Ohio, have invented certain new and useful Improvements in Wheeled Scrapers, of which the following is a specification.

Our invention relates to improvements in wheeled scrapers, and has especial reference to a locking and releasing device for the end gate which is adapted to swing into position when the scraper is loaded to retain the load while it is being transported, and which is adapted to be swung out of position when the load is to be dumped. For effective and practical operation, the manipulation of the end gate should take place automatically, the operator merely lifting and lowering the usual operating handles or levers for a scraper of this general type, and by this operation of lifting and lowering the operating levers, repeated as often as may be necessary, not only will the scraper pan be filled and dumped, but the end gate will also be properly positioned to retain the loading and removed to permit the discharge thereof. Our improvements therefore are not designed to affect the operation of the scraper construction except in the provision of automatic means for controlling the end gate.

The various features of construction and the operation thereof by which the above mentioned results are attained will be hereinafter specifically set forth.

Figure 1:
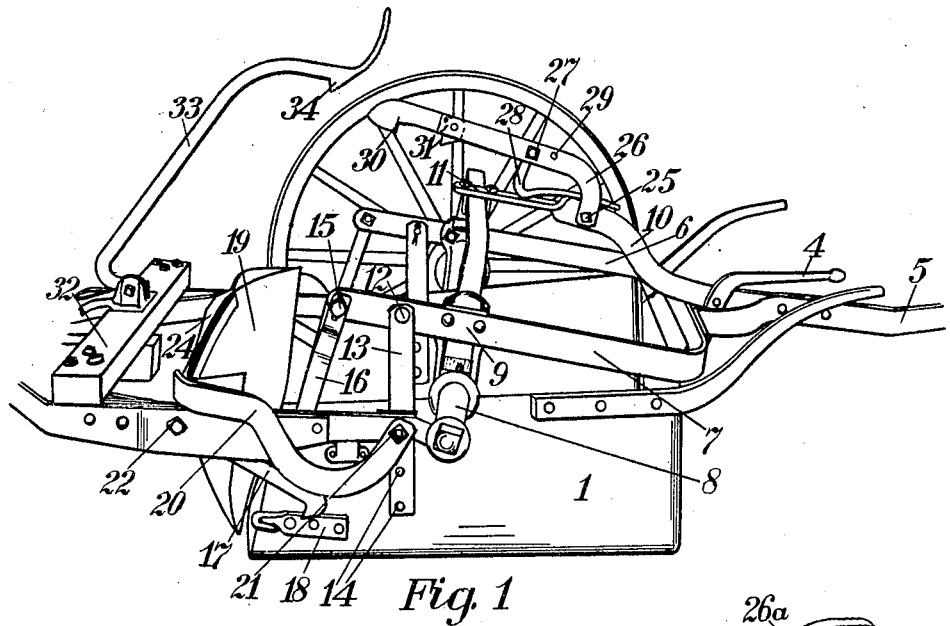
Figure 2:
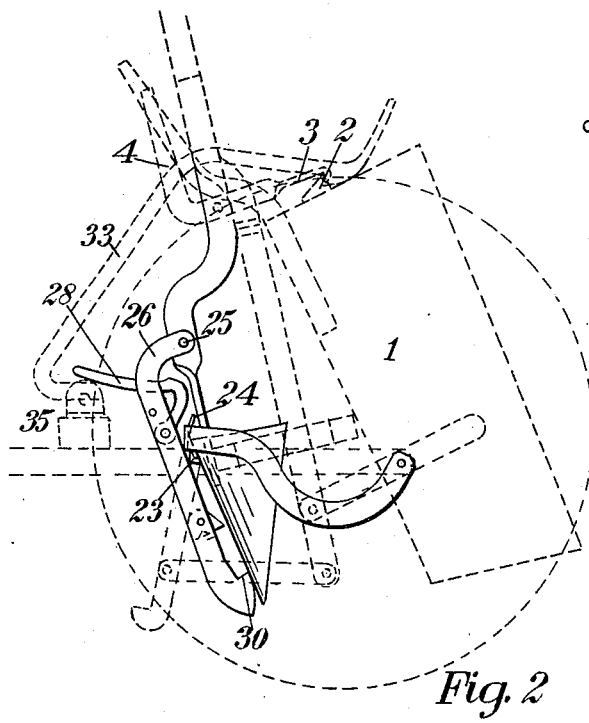
Figure 6:
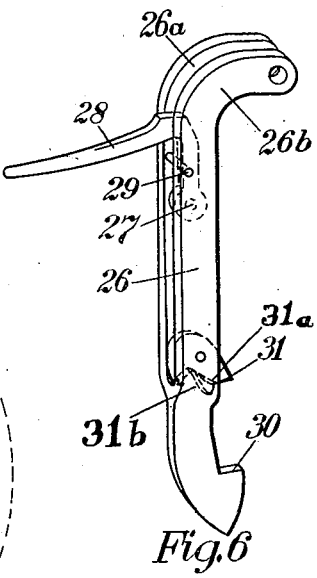
Figure 3:
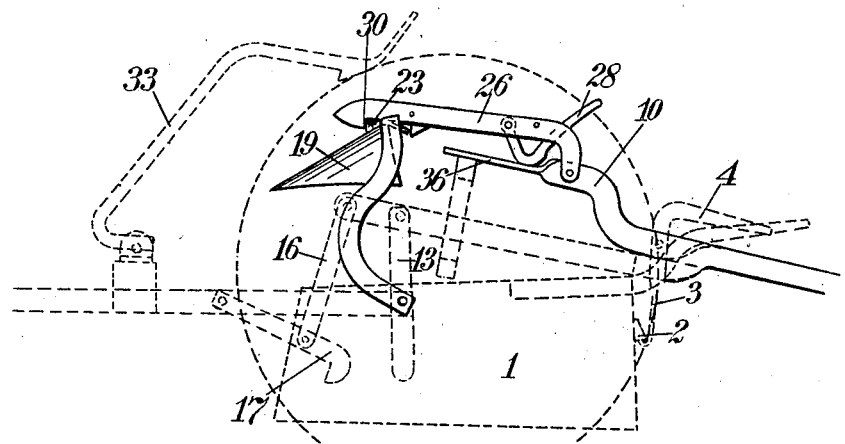
Figure 4:
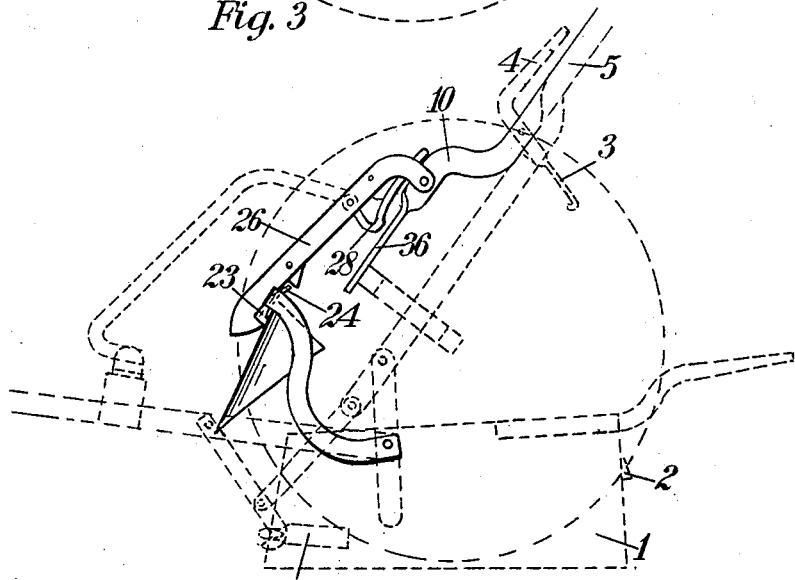
Figure 5:
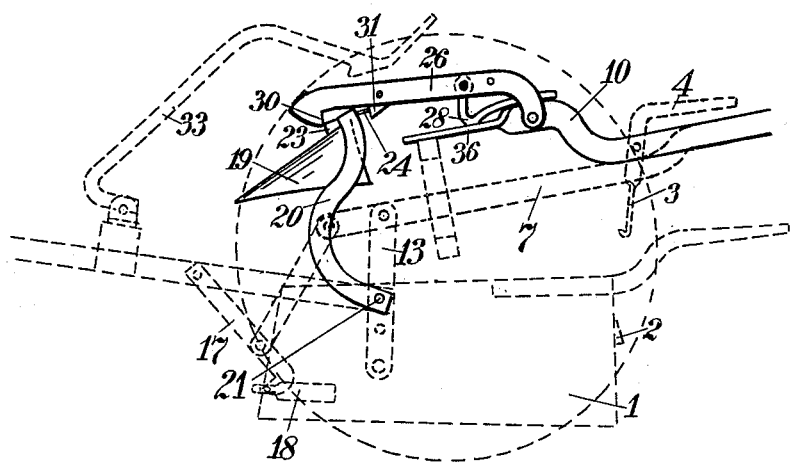

In the drawings which are hereto attached and hereby made a part of this specification, Figure 1 is a view of a wheeled scraper having one wheel removed therefrom with the parts in normal position; Fig. 2 shows the parts after they have been tilted forwardly for the purpose of picking up the end gate or locking the pan in vertical position; Fig. 3 shows the position of the parts after the end gate has been picked up and while the pan is still connected to the operating levers; Fig. 4 shows the position of the parts after the pan has been released from the operating levers and thereby permitted to drop to its loading position. Fig. 5 shows the position of the parts after the pan has been loaded and the operating levers have been retracted to the point where the end gate will be released to drop into its normal closed position; Fig. 6 is a detail of the end gate controlling levers.

Referring to the drawings in which the same numeral indicates the same part throughout, 1 is the scraper pan having a lug 2 thereon with which the hook 3 on the lower end of the locking lever 4 is adapted to engage, whereby the pan is connected to the main operating lever 5 having the branches 6 and 7 connected with the axle 8 at 9, whereby when the operating lever 5 is lifted, the pan will be carried therewith, and thereby tilted forwardly. The operating lever 5 is extended upwardly to form the arm 10 which is secured to the middle portion of the axle at 11, the axle being bent upwardly along its middle portion, and dropping downward at its ends to form bearings for the wheels. An upward lift on the operating lever 5 when the locking lever 4 is hooked to the pan over the lug 2, will raise the pan, and will also rotate the axle 8 forwardly through the connection between the axle and the arm 10 at 11, the wheels remaining stationary or being lifted from the ground; the branches 6 and 7 of the operating lever 5 are pivotally connected at 12 with the upwardly extending bar 13 rigidly secured to the pan 1 at 14, and the said branch levers 6 and 7 are further pivotally connected at 15 by the links 16 to the hook lever 17, the latter being adapted to engage with the fixed hooks 18 adjacent the open end of the pan 1. The connection between the link 16 and the locking lever 17 is clearly shown in Figs. 3 and 4 in the dotted lines, and the effect produced in tipping the pan or bringing the same to a vertical position, by the operation of the lever construction just described, is clearly shown in Fig. 2.

The pan 1 of the scraper is provided with an end gate 19, rigidly connected to the arms 20 which are pivotally mounted upon the scraper pan 1 at 21, whereby the end gate 19 is free to be raised or lowered; in its lower position, the end gate lies between the branches 22 of the tongue of the scraper, and the arms 20 rest thereon to support the end gate as is shown in Fig. 1, so that the weight of the end gate when in its lower position is borne by the tongue of the scraper and the bottom of the pan. Near the upper edge of the outer side of the end gate 19 is formed a lug or projection 23, having its upper end 24 extended above the upper edge of the end gate, and preferably given a slight inward curve. When the pan is lifted through the operation of the lever construction hereinbefore described, the end gate remains at rest upon the tongue, as described.

Pivotally mounted on the arm 10 at 25 is a lever 26 having pivotally mounted thereon at 27 the hook lever 28, the outward swing of which is limited by the stop pin 29; the lever 26 is provided with a hook 30 at one end thereof, and the pivoted dog 31 is mounted thereon at an appropriate distance from the hook 30 for a purpose to be presently described. In the position of the lever 26 shown in Fig. 1, the said lever is held in an elevated position by the hook lever 28 which supports the said lever 26. To lift the end gate in order to permit the loading of the pan, the lever 5 carrying the pan therewith is lifted until the parts assume the positions shown in Fig. 2; the lever 26 being supported on the hook lever 28, will necessarily pass on the outside of the end gate 19 between the end gate and the cross bar 32 on the tongue, and the engagement of the hook lever 28 with the projection 24 on the lug 23 will cause the said lever 28 to be moved from its position of support for the lever 26, whereupon the lever 26 will drop inwardly towards the pan, and when the operating lever 5 is retracted, the hook 30 will engage the lug 23, thereby lifting the end gate as the retraction of the operating lever 5 continues. The dog 31 is swung on its pivot by engagement with the lug 23, and the lever 26 therefore passes readily into the aforesaid position in which the hook 30 engages the lug 23, and the dog 31 then resumes its normal position shown in Fig. 3 on the upper side of the projection 24, so that the engagement of the lever 26 with the lug 23 can not be broken by jarring or shaking of the parts, the dog 31 acting as a stop against the movement of the lever 26 downwardly to release the end gate.

As seen, the face of the dog 31 which engages the lug 24 is curved as shown at 31$^a$, the curved face engaging the lever 26, the curved face being engaged and limited in its movement by the shoulder 31$^b$ formed where the lever 26 is bifurcated, whereby the dog 31 and the hook lever 28 may be securely pivoted between the two branches of said lever 26 shown at 26$^a$ and 26$^b$. When the lever 26 has been moved forward and has picked up the end gate 19, the dog 31 swings downwardly on its pivot so that the lug 23 is positioned between the hook 30 and the dog 31, and is securely held thereby, so that no degree of carelessness in handling or dropping the operating lever 5 will shake the end gate loose. When the lever 26 is retracted to release the end gate, the pivoted dog 31 swings out of its locking position, and when the point indicated in Fig. 5 is reached, the lug 23 is disengaged from the dog 31 at its end 24, and is free to drop when the lever 26 has been retracted slightly further than the point shown in Fig. 5.

After the end gate has been picked up by the hook 30 as described, the retraction of the operating lever 5 is continued until the parts are in the position shown in Fig. 3, wherein it is seen that the hook lever 28 rests loosely upon the arm 10, and does not furnish a support for the lever 26; the scraper pan is still connected to the operating levers by the locking lever 4, and the next step in the loading of the pan is to disconnect the locking lever 4 and permit the pan to drop downwardly, which will carry the operating lever and its connected parts forwardly to the position shown in Fig. 4; in passing to the position shown in Fig. 4, the arm 10 and the lever 26 swing somewhat apart from the position shown in Fig. 3, on account of the pivotal connections of the various levers, and when the pan has come to rest in its loading position in Fig. 4, the lever 28 has through gravity swung forwardly, and is in a proper position to prevent a nearer approach of the levers 10 and 26 than the length of the short arm of said lever 28. The scraper is now loaded by drawing the same forward in the usual manner, and the next step is the release of the end gate, which is effected by swinging the operating lever 5 downward. During this downward swing of the operating lever, the end gate will be retracted somewhat, and during the movement of the parts the lever 28 operates to lift the lever 26, and when the parts have reached the position shown in Fig. 5, the lever 28 has lifted the lever 26 sufficiently to cause the hook 30 to be released from the lug 23, whereupon the end gate through gravity drops into its normal closed position, the locking lever 4 is hooked to the scraper pan, and all the parts assume the position shown in Fig. 1, and the load is ready to be transported without spilling to any point desired. To discharge the load, the operating lever 5 with the scraper pan locked thereto, is swung upwardly and after reaching a position approximately vertical, the team is started and the loading will be discharged and distributed as desired. The scraper pan is held in this vertical position by the curved lever 33 pivoted on the cross bar 32 and provided with the hook 34 adapted to engage the lug 2 as appears in Fig. 2; when it is desired to lower the scraper, the lever 33 is swung on its pivot 35 into its normal unlocked position shown in Fig. 1.

To summarize, the cycle of operation of the parts to accomplish the function of the end gate controlling levers may be stated as follows: Beginning with the positions of the parts shown in Fig. 1, the operating lever 5 is rotated upwardly until the lever 28 is moved from its supporting position beneath lever 26, the latter thereupon dropping inwardly towards the end gate as shown in Fig. 2, and the lever 5 being thereupon retracted, the hook 30 engages and lifts the end gate until the parts are positioned as shown in Fig. 3; the dog 31 is swung by the lug 23 so as to assure the engagement of said lug by the hook 30 whereupon dog 31 swings downwardly to engage the end 24 of the lug 23 and thereby positively locks the lever 26 and end gate 19 together; the locking lever 4 is now disengaged from the scraper pan, the operating lever 5 is rotated downwardly and the arm 10 and lever 26 being swung further apart the lever 28 through gravity drops into the position shown in Fig. 4, being arrested in the proper position to exert a lifting influence on lever 26 by the engagement of its long arm with the curved portion of the arm 10; the parts now occupy approximately the position shown in Fig. 4; the scraper is then loaded and the lever 5 is retracted thereby causing the extreme outer end 36 of the arm 10 to approach lever 26, the degree of such approach being limited by the hook lever 28; the retraction of the lever 5 continuing, the dog 31 rotates on its pivot thereby retracting its hook out of engagement with the lug 23, whereupon the effect of the further retraction is to lift the lever 26 out of engagement with the end gate 19, whereupon the latter is free to fall to its normal position. Essentially, therefore, we have added to the wheeled scraper construction heretofore in use the lever 26 provided with the hook 30 and swinging catch 31 to engage the end gate, and the lever 28 to accomplish the release of the lever 26 from the end gate; the above description makes it clear that the operator is not required to manipulate the levers 26 and 28 individually, nor are there any other movements required for the manipulation of the end gate with our improvements than are normally required for the proper operation of the scraper without these improvements, as it is seen that the forward rotation of the parts whereby the lever 28 is rotated outwardly as shown in Fig. 2, is necessary to engage the lever 33 with the scraper pan to hold the same in approximately vertical position, which is the position usually adopted when the scraper is moved from place to place. The entire operation of the parts by our end gate controlling levers is therefore consequent upon the usual movement of the scraper manipulating construction, and hence they may be said to operate automatically; they are also disposed at the top of the operating mechanism and therefore can not act as an obstruction or hindrance to the free and proper operation of the scraper as such.

We do not desire to be limited to the specific formation and position of parts shown in the drawings and herein described, but claim any construction to accomplish the purpose herein set forth which falls within the spirit of our invention.

What we claim is;

1. In a wheeled scraper, a pivotally mounted end gate, an operating lever, a lever pivotally mounted upon said operating lever and adapted to engage and lift said end gate, and means engaging said levers for releasing said last mentioned lever from said end gate.

2. In a wheeled scraper, a pivotally mounted end gate, an operating lever, a second lever carried by said operating lever for engaging and lifting said end gate, and means carried by said second lever for effecting the release thereof from said end gate.

3. In a wheeled scraper, a pivotally mounted end gate, an operating lever, a second lever carried by said operating lever for engaging and lifting said end gate, a lever pivotally mounted on said second lever and adapted by engagement with said operating lever to release said second lever from said end gate, whereupon the latter is free to fall to its closed position.

4. In a wheeled scraper, a pivotally mounted end gate, an operating lever, a second lever pivotally carried by said operating lever for engaging and lifting said end gate, a lever pivotally carried on said second lever and adapted through gravity during the movements of the operating lever to assume such position as to cause said operating lever and said second lever to move in fixed relation with each other to effect the release of said end gate.

5. In a wheeled scraper, a pivotally mounted end gate, an operating lever, a second lever pivotally borne upon said operating lever to engage and lift and maintain said end gate in elevated position, and means interposed between said levers for causing the same to move in fixed relation with each other to effect the release of said end gate.

6. In a wheeled scraper, a pivotally mounted end gate, an operating lever, a second lever pivotally mounted upon said operating lever, means interposed between said levers for causing the same to move in fixed relation to each other to effect the release of said end gate, and means for displacing said means whereby said levers may move on their pivots relatively to each other.

7. In a wheeled scraper, a pivotally mounted end gate, an operating lever, a second lever pivotally borne upon said operating lever, a third lever pivotally mounted upon said second lever and adapted to be positioned between said operating lever and said second lever to cause the same to move in fixed relation to each other, and means mounted on said end gate to displace said third lever.

8. In a wheeled scraper, a pivotally mounted end gate, a hook lever adapted to engage and lift said end gate, means mounted on said hook lever for engaging said end gate to lock said hook lever thereto, said means being adapted to be thrown into unlocking position to release said hook lever from said end gate during the further operation of the scraper.

9. In a wheeled scraper, a pivotally mounted end gate, a hook lever adapted to engage and lift and maintain said end gate in elevated position, a pivoted dog on said hook lever adapted to lock said lever to said end gate, said dog being constructed to swing out of its said locking position during the further operation of the scraper to release said end gate.

10. In a wheeled scraper, a swinging end gate, an operating lever, means for automatically engaging said end gate and lifting the same to open position, and means for automatically releasing said end gate.

In testimony whereof we affix our signatures in the presence of two witnesses.

THOMAS H. STAGG.
JOHN ANTHONY.

Witnesses:
E. BRENTON BOGGS,
J. B. PINNEY.